(12) United States Patent  
Haldiman

(10) Patent No.: US 8,029,676 B2
(45) Date of Patent: Oct. 4, 2011

(54) NON-RECIRCULATING, SELF-SANITIZING CARBON FILTER SYSTEM

(75) Inventor: Jason N. Haldiman, Sugar Land, TX (US)

(73) Assignee: Mechanical Equipment Company, Inc., Sugar Land, TX (US)

( * ) Notice: Subject to any disclaimer, the term of this patent is extended or adjusted under 35 U.S.C. 154(b) by 529 days.

(21) Appl. No.: 12/157,484

(22) Filed: Jun. 11, 2008

(65) Prior Publication Data

US 2009/0308813 A1 Dec. 17, 2009

(51) Int. Cl.
B01D 15/00 (2006.01)

(52) U.S. Cl. ...................................... 210/669
(58) Field of Classification Search .................. 210/669
See application file for complete search history.

(56) References Cited

U.S. PATENT DOCUMENTS

| 4,515,692 | A   | * | 5/1985  | Chandler et al. | 210/278 |
| 6,622,754 | B1  | * | 9/2003  | Roth et al.     | 134/18  |
| 2006/0180179 | A1 | * | 8/2006  | Roderer et al.  | 134/18  |
| 2008/0283099 | A1 | * | 11/2008 | Peukert et al.  | 134/99.1 |
| 2009/0152211 | A1 | * | 6/2009  | Crits et al.    | 210/774 |
| 2010/0012569 | A1 | * | 1/2010  | Ambroiggio et al. | 210/232 |

* cited by examiner

*Primary Examiner* — Chester Barry
(74) *Attorney, Agent, or Firm* — Wood, Phillips, Katz, Clark & Mortimer

(57) ABSTRACT

A method and apparatus are provided for the non-recirculating self-sanitization of a carbon filter (14) in a water pretreatment system (12). The apparatus includes a heat exchanger (50) that can maintain an activated carbon bed (44) of the carbon filter (14) at a desired sanitization temperature during service operation of the pretreatment system (12) where the pretreatment system (12) is providing a pretreated water stream ($32_H$) for final treatment.

11 Claims, 2 Drawing Sheets

NON-RECIRCULATING, SELF-SANITIZING CARBON FILTER SYSTEM

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to water treatment and pretreatment systems, and more particularly, to carbon filters used therein.

BACKGROUND OF THE INVENTION

Many industries, including the bottled water, semiconductor, and pharmaceutical industries, utilize water in various ways to manufacture products, clean and sanitize components, and/or to provide services. For many of the industrial uses of water, the water must repeatably meet stringent quality requirements. For example, being the most widely used ingredient in the manufacture of drugs, within the pharmaceutical industry, water must meet stringent quality requirements mandated by the Food and Drug Administration, whether the water is used for cleaning, sanitizing, or for drug manufacturing. It is typical for water pretreatment and final treatment systems, and in particular pharmaceutical water pretreatment and final treatment systems, to include a number of components, including for pretreatment: media filters for removal of suspended solids, water softeners for hardness and ammonia (if required) removal, carbon filters to dechlorinate the water, polishing water softeners for ammonia removal, and a reverse osmosis or distillation system for final treatment.

In order to ensure proper operation and overall service life of such systems and their various components, a number of factors must be considered. Two such factors are the removal of microbial control agents (dechlorination) and control of microbial bacterial growth (sanitization). In this regard, the removal of microbial control agents is often necessary for such systems because the water provided by the local municipality often contains microbial control agents, such as chlorine or chloramines, which are put into the water by the local municipality to control bacteria within the municipality's distribution network. Such microbial control agents can be detrimental to some water pretreatment and final treatment components. For example, such microbial control agents can cause premature failures of reverse osmosis membranes and can cause severe stress cracking and corrosion of austenitic stainless steel components.

In order to remove such microbial control agents, water pretreatment systems can utilize a number of methods, two of which are chemical injection and carbon filtration. Because chemical injection introduces a possibility of chemical contamination of the water being treated, carbon filtration is widely accepted as the preferred method in the pharmaceutical industry. Carbon filter dechlorination is accomplished by passing chlorinated water over a bed of activated carbon media contained within a pressure vessel generally constructed of fiberglass, lined carbon steel, or stainless steel. Typically the activated carbon media is a natural material manufactured from coal, wood, peat, or coconut shell, which when activated by steam or other means has a tremendous adsorption capability provided by its microscopic physical structure and large internal surface area. As chlorinated water passes over the activated carbon bed, chlorine adheres to the surface of the carbon granules and is removed from the water. Carbon filtration can also be an effective means for the breakdown of chloramines (a combination of chlorine and ammonia). However, although the carbon media will adsorb the chlorine, subsequent downstream processes must be considered to address ammonia removal.

While they are an effective means for dechlorination, carbon filters can create an optimum environment for microbial bacteria to prosper, which raises the second factor identified above, control of microbial bacterial growth, thereby requiring that the carbon filters be sanitized, at least periodically, in order to control microbial bacterial growth. Within the pharmaceutical industry, carbon filters are sanitized typically by heat or by the addition of a chemical disinfectant, with provisions for validation and monitoring the effectiveness of the sanitization process also being requirements. When chemical disinfectants are used, provisions must be made to remove the chemical disinfectants and to monitor such removal. Because of this, heat sanitization is generally regarded as the preferred method.

Heat sanitization is accomplished by either elevating the temperature of water flowing through the carbon bed of the carbon filter, via an external heating source and recirculating system, or by the injection of clean steam into the carbon filter directly. Heat sanitization is an effective method to control microbial bacteria because the elevated temperature prohibits the survival of microbial bacteria. However, with either approach, the carbon filter must be isolated from service during the sanitization process, and both approaches require subsequent backwashing and rinsing steps to flush out the dead bacteria from the system. Unless the system includes a redundant carbon filter (which doubles the sites where bacteria can grow and proliferate), the water pretreatment process must be suspended for the duration of the sanitization process. If a redundant carbon filter is utilized in the system, the redundant filter must be properly sized to handle the full service load of the pretreatment system, or sanitization must be scheduled during periods of low demand. Typically, such heat sanitization process includes the steps of: isolating the carbon filter from service, draining the carbon filter (for clean steam approach only), heating, holding that temperature for sanitization, cooling down, backwashing and rinsing, and return to service.

SUMMARY OF THE INVENTION

In accordance with one feature of the invention, a method is provided for sanitizing a carbon filter having a carbon bed for treating a water stream in a water pretreatment system. The method including the steps of:

a) passing the water stream through the carbon bed while the water pretreatment system is in a service mode treating the water stream; and b) maintaining the carbon bed at a sanitization temperature that is high enough to provide acceptable prevention of microbial bacteria growth during the step of passing the water stream through the carbon bed.

As one feature, step b) includes transferring heat from a medium other than the water stream to maintain the carbon bed at the sanitization temperature. As a further feature, the medium is a steam flow that is hydraulically isolated from the water stream.

According to one feature, the method further includes the step of recovering heat from the water stream after it exits the carbon bed. In a further feature, the step of recovering heat includes transferring heat to the water stream that has yet to enter the carbon bed from the water stream that has exited the carbon bed. As yet another feature, the water stream exiting the carbon filter has been heated to a temperature greater than the sanitization temperature and the water stream entering the carbon filter is heated to a temperature of at least the sanitization temperature.

In one feature, the method further includes the step of maintaining the carbon bed at the sanitization temperature with the pretreatment system operating in a stand-by mode wherein the water stream is no longer passing through the carbon filter.

As one feature, the step of maintaining the carbon bed at a sanitization temperature includes transferring heat to the carbon bed downstream from a predetermined portion of the carbon bed.

In one feature, the sanitization temperature is at least 120° F.

According to one feature, the sanitization temperature is at least 180° F.

As one feature, step b) is performed continuously during the service mode.

In accordance with one feature of the invention, a carbon filter is provided for use in a water pretreatment system for treating a water stream. The carbon filter includes a housing, a carbon bed contained within the housing, and a heat exchanger carried by the housing and located to transfer heat to the carbon bed.

In one feature, the heat exchanger includes a hot fluid flow path hydraulically isolated from the water stream and located to transfer heat to the carbon bed.

According to one feature, the heat exchanger includes a fluid jacket extending over a portion of an exterior of the housing to define the hot fluid flow path.

As one feature, the housing defines a chamber holding the carbon bed and the heat exchanger is located outside of the chamber.

In one feature, the housing defines a chamber holding the carbon bed and the heat exchanger is located within the chamber.

According to one feature, the heat exchanger is located downstream from a selected portion of the carbon bed.

In accordance with one feature of the invention, a water pretreatment system is provided for treating a water stream. The pretreatment system includes a carbon filter including a carbon bed; a carbon bed heat exchanger located to transfer heat to the carbon bed, and a recuperative heat exchanger having first and second fluid flow paths in heat transfer relation. The first flow path is connected to the carbon filter to supply the water stream to the carbon bed, and the second flow path is connected to the carbon filter to receive the water stream after the water stream has exited the carbon bed.

As one feature, the carbon bed heat exchanger is carried by the carbon filter.

According to one feature, the carbon bed heat exchanger is carried on an exterior of the carbon filter.

In one feature, the carbon bed heat exchanger is carried on an interior of the carbon filter.

As one feature, the heat exchanger includes a hot fluid flow path in heat transfer relation with the carbon bed.

In one feature, the heat exchanger includes a fluid jacket integral with a housing of the fluid filter.

Other objects, features, and advantages of the invention will become apparent from a review of the entire specification, including the appended claims and drawings.

DETAILED DESCRIPTION OF THE PREFERRED EMBODIMENTS

Figure 1:
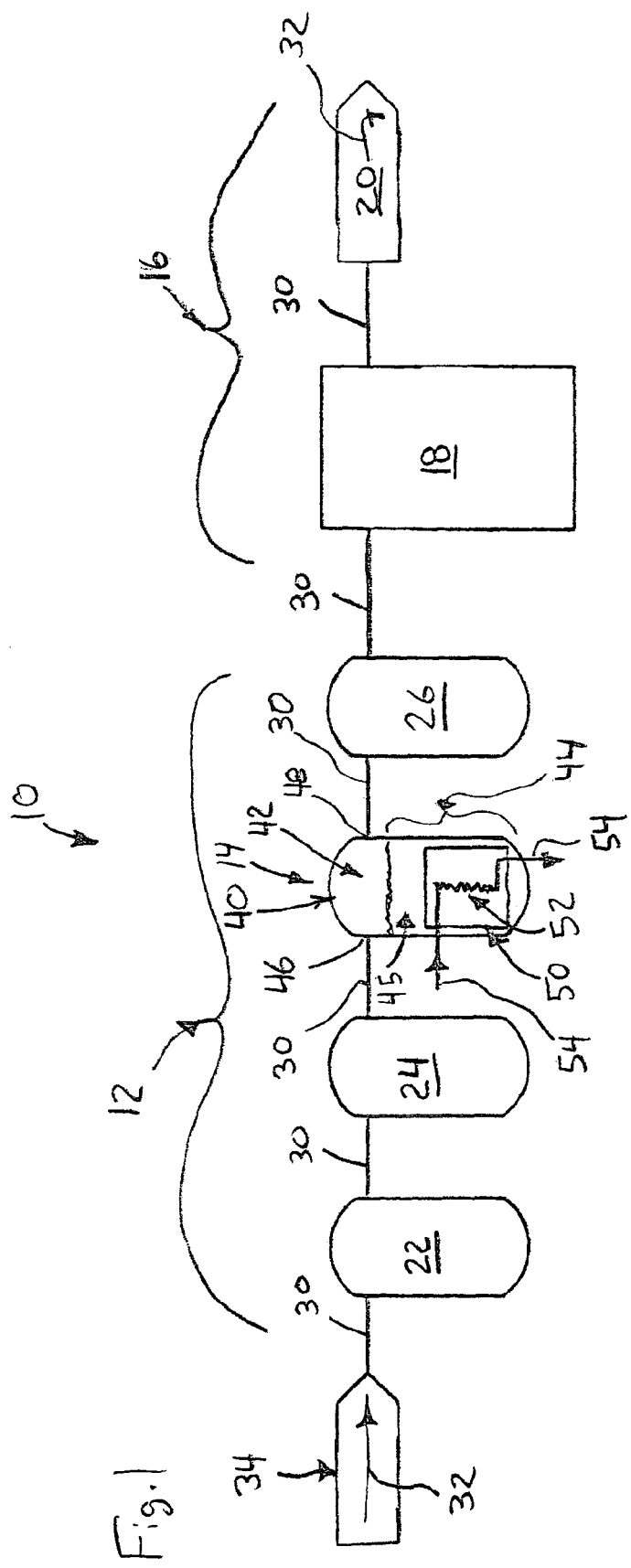
FIG. 1 is a somewhat diagrammatic representation of a water treatment system including a water pretreatment system and carbon filter sanitization system/device embodying the present invention.

As seen in FIG. 1, a water treatment system 10 includes a water pretreatment system 12 including a non-recirculating, self-sanitizing carbon filter 14 embodying the present invention coupled to a final treatment system 16. For illustration purposes, the final treatment system 16 is shown to include either a reverse osmosis or distillation device 18 and a storage tank 20, however, the final treatment system 16 can include any suitable components or devices as are known to those skilled in the art. In addition to the carbon filter 14, the pretreatment system 12 includes a multi-media filter 22, a water softener 24 downstream of the filter 22 and upstream of the carbon filter 14, and a polishing water softener 26 (optional) downstream of the carbon filter 24 and upstream of the final treatment system 16, with all of the components of the system 10 connected by suitable water flow conduits or pipes 30 for directing a water stream 32 supplied by a water source 34, such as a municipal water supply, through the system 10 for treatment. It should be understood that while specific examples of a water treatment system 10 and pretreatment system 12 are described herein, the invention can find use in any treatment/pretreatment systems utilizing any of the suitable components or devices that are known for such systems.

The carbon filter 14 includes a housing 40 (preferably cylindrical with domed top and bottom caps) defining an internal chamber 42 that contains a bed 44 of activated carbon media 45 for dechlorinating the water stream 32 as it passes through the filter 14 when the pretreatment system 12 is in a service mode pretreating the water stream 32 before it is directed downstream to the final treatment system 16. In this regard, the housing 40 includes an inlet port 46 for receiving the water stream 32 to be directed through the carbon bed 44, and an outlet port 48 for the water stream 32 to exit the water filter 14 after it has been directed through the carbon bed 44. The carbon filter also includes a heat exchanger, shown schematically at 50, that is carried by the housing 40 and located to transfer heat to the carbon bed 44 from a medium that is hydraulically isolated from the water stream 32 passing through the carbon bed 44. In this regard, it is preferred that the heat exchanger 50 include a hot fluid flow path 52 that is hydraulically isolated from the water stream 32 and that is located to transfer to the carbon bed 44 heat from hot fluid 54 flowing through the flow path 52. In the illustrated embodiment, it is preferred that the hot fluid 54 be provided as a steam flow from a steam source (not shown), however, any suitable hot fluid flow could be used. Furthermore, any suitable heat exchanger construction or type 50 can be utilized in the system 12 and the filter 14, including, for example, electric resistance heaters, a gas-fired heat exchanger, an infrared heat exchanger, and/or a combination of any of the foregoing heat exchangers. Additionally, the heat exchanger 50 can be located within the chamber 44 in the form of a heat transfer coil, spiral cage, or other suitable construction, either embedded in the carbon media 45 of the bed 44 or adjacent or encircling the bed 44, or can be located external from the chamber 42 with the transfer of heat occurring through the walls of the housing 40. While not shown, it will often be desirable to include internal distribution and collection systems within the housing 40 to distribute the water stream 32 over the carbon bed 44 and to collect backwash water during backwash cycles, respectively. However, in some applications such distribution and collection systems may not be desirable and/or required.

Figure 2:
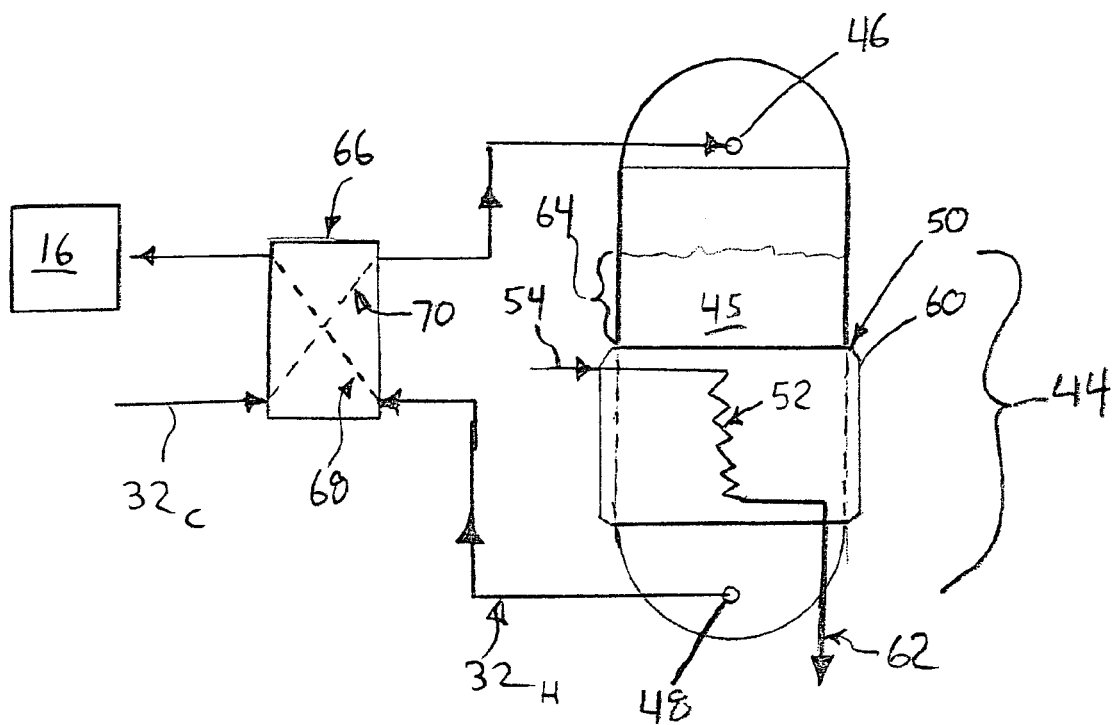
FIG. 2 is a somewhat diagrammatic representation of the carbon filter sanitization system/device shown in FIG. 1.

With reference to FIG. 2, one possible example of the heat exchanger 50 is shown in the form of a fluid jacket 60 that surrounds an exterior surface of the housing 40 and defines the fluid flow path 52 to direct a steam flow 54 in heat exchange relation with the carbon bed 44. In this example, the heat exchanger 50 and its flow path 52 is preferably configured such that the steam flow 54 will condense as a result of the transfer of heat to the carbon bed 44 and the water stream 32 so that the steam flow 54 is converted to a condensate flow 62 that exits the heat exchanger 50, such as shown at 61. As also seen in FIG. 2, it is preferred that the heat exchanger 50 be located downstream from a selected portion 64 of the carbon bed 44 in order to maintain a lower temperature in the portion 64, which can enhance the performance of the filter 14. In this regard, it is preferred that the portion 64 be selected such that at least a majority of the dechlorination of the water stream 32 occurs within the selected portion 64. Regardless of the placement of the heat exchanger 50, it is preferred that the heat exchanger 50 be sized and configured so that it will maintain the entire carbon bed at a high enough sanitization temperature to provide acceptable prevention of microbial bacteria growth and/or survival. In this regard, the ISPE Baseline Guide for Pharmaceutical Water and Steam Systems states that, for microbial control of pharmaceutical storage and distribution systems, systems operating at 180° F. (80° C.) have a long history of data showing the prevention microbial bacterial survival. Thus, 180° F. is commonly benchmarked as the temperature for effective sanitization of carbon filter systems utilizing hot water, and would be at least one acceptable sanitization temperature at which to maintain the carbon bed 44. While 180° F. is one highly preferred sanitization temperature for the filter 14, it should be understood the specific sanitization temperature will be highly dependent upon the parameters of each particular application, including the water source 34 and the particular type of bacterial strain or strains that must be controlled. For example, it is anticipated that in some applications, a sanitization temperature as low as 120° F. may be desirable. It should also be understood that as used in the industry, the terms "microbial" and "bacteria" are used to cover an array of micro-organisms.

FIG. 2 also illustrates an optional, but preferred, feature for the non-recirculating, self-sanitizing carbon filter 14 in the form of a recuperative heat exchanger 66 that has been provided in order to recover heat from the water stream $32_H$ after it exits the carbon bed 44 by transferring heat from the water stream $32_H$ to the water stream $32_C$ that has yet to enter the carbon bed 44. In this regard, the heat exchanger 66 includes a "hot" fluid flow path 68 in heat exchange relation with a "cold" fluid flow path 70 in order to achieve the desired transfer of heat. In a preferred embodiment, the recuperative heat exchanger 66 is sized and configured such that an inlet water stream $32_c$ having a temperature of 55° F. (or about 55° F.) is elevated to a temperature of at least 180° F. (or about 180° F.) based on a temperature of a water stream $32_H$ exiting the filter 14 that is 188° F. (or about 188° F.), with an exit temperature of water stream $32_H$ from the recuperative heat exchanger 66 of 63° F. (or about 63° F.) to be supplied to the final treatment system 16. As with the heat exchanger 50, any suitable construction can be utilized for the recuperative heat exchanger 66, many of which are known. It should be understood that the recuperative heat exchanger 66 can either be a separate, stand-alone component from the housing 40, or can be integrated with the housing 40.

For all of the components 14, 50, and 66, careful consideration should be given to the materials selected, especially for any high temperature components that are in contact with chlorinated water or that which contains chlorides. In this regard, chlorine can cause severe stress-corrosion and cracking of certain stainless steels that are commonly utilized within the pharmaceutical industry, especially at the desired operating temperatures for the carbon filter 14.

As previously noted, the carbon filter 14 is intended to provide continuous sanitization of the carbon bed 44 while the system 10 is in service providing treated water from the water source 34. In this regard, the media 45 is sized for proper contact time for the removal of chlorine, and when required, the removal of trace organics and organic compounds, at the desired service flow rate. The water stream 32 is passed through the carbon bed 44 while the water pretreatment system 12 is in the service mode pretreating the water stream 32, and the carbon bed 44 is maintained at the desired sanitization temperature (typically at least 180° F.) or higher during this time. As noted, the heat exchanger 50 is configured to maintain the carbon bed at the desired sanitization temperature (typically at least 180° F.) during service operation by transferring heat from a medium other than the water stream 32, such as from the steam flow 54, that is hydraulically isolated from the water stream 32. As discussed above in connection with the recuperative heat exchanger 66, heat from the water stream $32_H$ exiting the carbon bed 44 can be recovered by transferring the heat to the water stream $32_C$ that has yet to enter the carbon bed 44. In this regard, in a preferred embodiment, the water stream $32_H$ exiting the carbon filter 14 is heated by the heat exchanger 50 to a temperature greater than 180° F. and the water stream $32_C$ entering the carbon filter 14 is heated to a temperature of at least 180° F. Importantly, it will also be desirable in most systems 10 to maintain the carbon bed 44 at the desired sanitization temperature or higher (typically a temperature of at least 180° F.) when the pretreatment system 12 is in a standby mode, wherein the water stream 32 is no longer passing through the carbon filter 14. This will again be accomplished by the heat transfer from the medium passing through the heat exchanger 50 to the carbon bed 44.

It should be understood that the system 12 and filter 14 can be designed for any flow rate or range of flow rates for the water stream 32. For example, a flow rate of 5 gallons/minute (gpm) might call for the housing 40 to be approximately 1 foot in diameter to provide a suitable size for the carbon bed 44, while a flow rate of 135 gpm might call for the housing 40 to be approximately 5 foot in diameter provide a suitable size for the carbon bed 44.

It should be appreciated that the carbon filter 14 and its disclosed method of operation provides an effective means for continuous control of microbial bacteria within the carbon filter 14, and can provide a number of other advantages for end users. For example, because the carbon filter 14 is maintained at elevated temperatures while producing a pretreated water stream, there is no down time associated with the periodic heat sanitization associated with conventional systems. By way of further example, the disclosed carbon filter 14 and method can eliminate the additional components associated with conventional sanitization systems. In this regard, it should be appreciated that the disclosed carbon filter 14 and method can be achieved without the requirement for additional moving or rotating parts, such as with the recirculation pumps and/or controllable valves of conventional sanitization systems. With use of the recuperative heat exchanger 66, the tempered water stream $32_H$ can be provided at temperatures that are optimum for downstream components and processes, such as reverse osmosis systems. Furthermore, it is believed that activated carbon can achieve greater performance at certain elevated temperatures than at lower temperatures.

The invention claimed is:

1. A method of sanitizing a carbon filter having a carbon bed for treating a water stream in a water pretreatment system, the method comprising the steps of:
   a) passing the water stream through the carbon bed while the water pretreatment system is in a service mode treating the water stream;
   b) maintaining the carbon bed at a sanitization temperature that is high enough to provide acceptable prevention of microbial bacteria growth during the step of passing the water stream through the carbon bed.

2. A method of sanitizing a carbon filter having a carbon bed for treating a water stream in a water pretreatment system, the method comprising the steps of:
   a) passing the water stream through the carbon bed while the water pretreatment system is in a service mode treating the water stream;
   b) maintaining the carbon bed at a sanitization temperature that is high enough to provide acceptable prevention of microbial bacteria growth during the step of passing the water stream through the carbon bed;
   wherein the step b) comprises transferring heat from a medium other than the water stream to maintain the carbon bed at the sanitization temperature.

3. The method of claim 2 wherein the medium is a steam flow that is hydraulically isolated from the water stream.

4. The method of claim 1 further comprising the step of recovering heat from the water stream after it exits the carbon bed.

5. The method of claim 4 wherein the step of recovering heat comprises transferring heat to the water stream that has yet to enter the carbon bed from the water stream that has exited the carbon bed.

6. 5 A method of sanitizing a carbon filter having a carbon bed for treating a water stream in a water pretreatment system, the method comprising the steps of:
   a) passing the water stream through the carbon bed while the water pretreatment system is in a service mode treating the water stream;
   b) maintaining the carbon bed at a sanitization temperature that is high enough to provide acceptable prevention of microbial bacteria growth during the step of passing the water stream through the carbon bed;
   wherein the water stream exiting the carbon filter has been heated to a temperature greater than the sanitization temperature and the water stream entering the carbon filter is heated to a temperature of at least the sanitization temperature.

7. A method of sanitizing a carbon filter having a carbon bed for treating a water stream in a water pretreatment system, the method comprising the steps of:
   a) passing the water stream through the carbon bed while the water pretreatment system is in a service mode treating the water stream;
   b) maintaining the carbon bed at a sanitization temperature that is high enough to provide acceptable prevention of microbial bacteria growth during the step of passing the water stream through the carbon bed;
   further comprising the step of maintaining the carbon bed at the sanitization temperature with the pretreatment system operating in a stand-by mode wherein the water stream is no longer passing through the carbon filter.

8. A method of sanitizing a carbon filter having a carbon bed for treating a water stream in a water pretreatment system, the method comprising the steps of:
   a) passing the water stream through the carbon bed while the water pretreatment system is in a service mode treating the water stream;
   b) maintaining the carbon bed at a sanitization temperature that is high enough to provide acceptable prevention of microbial bacteria growth during the step of passing the water stream through the carbon bed;
   wherein the step of maintaining the carbon bed at a sanitization temperature comprises transferring heat to the carbon bed downstream from a predetermined portion of the carbon bed.

9. The method of claim 1 wherein the sanitization temperature is at least 120° F.

10. The method of claim 1 wherein the sanitization temperature is at least 180° F.

11. The method of claim 1 wherein step b) is performed continuously during the service mode.

\* \* \* \* \*